United States Patent
Mukherjee et al.

(10) Patent No.: US 10,623,949 B2
(45) Date of Patent: Apr. 14, 2020

(54) NETWORK-INITIATED RECOVERY FROM A TEXT MESSAGE DELIVERY FAILURE

(71) Applicant: Cisco Technology, Inc., San Jose, CA (US)

(72) Inventors: Arghya Mukherjee, Acton, MA (US); Amarnath Sury Arvind, Hinsdale, IL (US); Vineet Gupta, San Diego, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/058,272

(22) Filed: Aug. 8, 2018

(65) Prior Publication Data

US 2020/0053556 A1 Feb. 13, 2020

(51) Int. Cl.
*H04W 8/30* (2009.01)
*H04W 4/14* (2009.01)

(52) U.S. Cl.
CPC .............. *H04W 8/30* (2013.01); *H04W 4/14* (2013.01)

(58) Field of Classification Search
CPC .................. H04W 8/30; H04W 4/14
See application file for complete search history.

(56) References Cited

U.S. PATENT DOCUMENTS

| | | |
|---|---|---|
| 4,236,068 A | 11/1980 | Walton |
| 5,642,303 A | 6/1997 | Small et al. |
| 5,751,223 A | 5/1998 | Turner |
| 6,370,390 B1 * | 4/2002 | Salin ................ H04W 4/12 455/422.1 |

(Continued)

FOREIGN PATENT DOCUMENTS

| | | |
|---|---|---|
| WO | WO 2013/020126 | 2/2013 |
| WO | WO 2014/098556 | 6/2014 |

(Continued)

OTHER PUBLICATIONS

3GPP TS 23.060 Version 14.4.0 , Jun. 2017 (Year: 2017).*

(Continued)

*Primary Examiner* — Minjung Kim
(74) *Attorney, Agent, or Firm* — Polsinelli PC

(57) ABSTRACT

Systems and methods provide for network-initiated recovery from a failure during transmission of text messages (e.g., Short Message Service or SMS) sent from circuit-switched (CS)/packet-switched (PS) infrastructure to a Mobile Station or User Equipment (MS/UE) connected to a PS radio access network. A text message service center (e.g., SMS Center or SMSC) can receive a message destined for the MS/UE. The SMSC can request from a home location register (HLR) routing information to a first text message interworking function (e.g., SMS-IWF) associated with a first visitor location register (VLR). The SMSC can receive data indicating that the first SMS-IWF/VLR is unreachable. The SMSC can transmit to the HLR an indication of an absent subscriber causing the HLR to request a Mobility Management Entity (MME) to reattach the MS/UE to a second SMS-IWF/VLR. In some embodiments, the MS/UE may reattach only to the second SMS-IWF/VLR (e.g., instead of a full reattach).

20 Claims, 7 Drawing Sheets

(56) References Cited

U.S. PATENT DOCUMENTS

| | | | |
|---|---|---|---|
| 6,731,932 B1* | 5/2004 | Rune | H04W 8/12 455/422.1 |
| 6,812,824 B1 | 11/2004 | Goldinger et al. | |
| D552,603 S | 10/2007 | Tierney | |
| 7,573,862 B2 | 8/2009 | Chambers et al. | |
| D637,569 S | 5/2011 | Desai et al. | |
| 7,975,262 B2 | 7/2011 | Cozmei | |
| 8,010,079 B2 | 8/2011 | Mia et al. | |
| 8,102,814 B2 | 1/2012 | Rahman et al. | |
| 8,260,320 B2 | 9/2012 | Herz | |
| 8,284,748 B2 | 10/2012 | Borghei | |
| 8,300,594 B1 | 10/2012 | Bernier et al. | |
| 8,325,626 B2 | 12/2012 | Tóth et al. | |
| 8,396,485 B2 | 3/2013 | Grainger et al. | |
| 8,446,899 B2 | 5/2013 | Lei et al. | |
| 8,458,184 B2 | 6/2013 | Dorogusker et al. | |
| D691,636 S | 10/2013 | Bunton | |
| 8,549,638 B2 | 10/2013 | Aziz | |
| 8,644,301 B2 | 2/2014 | Tamhankar et al. | |
| 8,650,279 B2 | 2/2014 | Mehta et al. | |
| 8,669,902 B2 | 3/2014 | Pandey et al. | |
| 8,676,182 B2 | 3/2014 | Bell et al. | |
| 8,682,279 B2 | 3/2014 | Rudolf et al. | |
| 8,693,367 B2 | 4/2014 | Chowdhury et al. | |
| 8,718,644 B2 | 5/2014 | Thomas et al. | |
| 8,768,389 B2 | 7/2014 | Nenner et al. | |
| 8,849,283 B2 | 9/2014 | Rudolf et al. | |
| 8,909,698 B2 | 12/2014 | Parmar et al. | |
| 8,958,318 B1 | 2/2015 | Hastwell et al. | |
| 9,060,352 B2 | 6/2015 | Chan et al. | |
| 9,130,859 B1 | 9/2015 | Knappe | |
| 9,173,084 B1 | 10/2015 | Foskett | |
| 9,173,158 B2 | 10/2015 | Varma | |
| D744,464 S | 12/2015 | Snyder et al. | |
| D757,424 S | 5/2016 | Phillips et al. | |
| D759,639 S | 6/2016 | Moon et al. | |
| 9,389,992 B2 | 7/2016 | Gataullin et al. | |
| 9,426,305 B2 | 8/2016 | De Foy et al. | |
| D767,548 S | 9/2016 | Snyder et al. | |
| D776,634 S | 1/2017 | Lee et al. | |
| 9,544,337 B2 | 1/2017 | Eswara et al. | |
| 9,609,504 B2 | 3/2017 | Karlqvist et al. | |
| 9,642,167 B1 | 5/2017 | Snyder et al. | |
| 9,654,344 B2 | 5/2017 | Chan et al. | |
| 9,713,114 B2 | 7/2017 | Yu | |
| 9,772,927 B2 | 9/2017 | Gounares et al. | |
| 9,820,105 B2 | 11/2017 | Snyder et al. | |
| D804,450 S | 12/2017 | Speil et al. | |
| 9,858,559 B2 | 1/2018 | Raleigh et al. | |
| 9,860,151 B2 | 1/2018 | Ganichev et al. | |
| 9,933,224 B2 | 2/2018 | Dumitriu et al. | |
| 9,923,780 B2 | 3/2018 | Rao et al. | |
| 9,967,906 B2 | 5/2018 | Verkaik et al. | |
| 9,980,220 B2 | 5/2018 | Snyder et al. | |
| 9,985,837 B2 | 5/2018 | Rao et al. | |
| 2003/0087645 A1 | 5/2003 | Kim et al. | |
| 2003/0116634 A1 | 6/2003 | Tanaka | |
| 2004/0203572 A1 | 10/2004 | Aerrabotu et al. | |
| 2005/0090225 A1 | 4/2005 | Muehleisen et al. | |
| 2005/0169193 A1 | 8/2005 | Black et al. | |
| 2005/0186904 A1 | 8/2005 | Kowalski et al. | |
| 2006/0022815 A1 | 2/2006 | Fischer et al. | |
| 2006/0030290 A1 | 2/2006 | Rudolf et al. | |
| 2006/0092964 A1 | 5/2006 | Park et al. | |
| 2006/0126882 A1 | 6/2006 | Deng et al. | |
| 2006/0187866 A1 | 8/2006 | Werb et al. | |
| 2007/0037605 A1 | 2/2007 | Logan | |
| 2007/0239854 A1 | 10/2007 | Janakiraman et al. | |
| 2008/0037715 A1 | 2/2008 | Prozeniuk et al. | |
| 2008/0084888 A1 | 4/2008 | Yadav et al. | |
| 2008/0101381 A1 | 5/2008 | Sun et al. | |
| 2008/0163207 A1 | 7/2008 | Reumann et al. | |
| 2008/0233969 A1 | 9/2008 | Mergen | |
| 2009/0129389 A1 | 5/2009 | Halna DeFretay et al. | |
| 2009/0203370 A1 | 8/2009 | Giles et al. | |
| 2009/0282048 A1 | 11/2009 | Ransom et al. | |
| 2009/0298511 A1 | 12/2009 | Paulson | |
| 2009/0307485 A1 | 12/2009 | Weniger et al. | |
| 2010/0039280 A1 | 2/2010 | Holm et al. | |
| 2010/0097969 A1 | 4/2010 | De Kimpe et al. | |
| 2011/0087799 A1 | 4/2011 | Padhye et al. | |
| 2011/0142053 A1 | 6/2011 | Van Der Merwe et al. | |
| 2011/0165898 A1* | 7/2011 | Drevon | H04W 4/12 455/466 |
| 2011/0182295 A1 | 7/2011 | Singh et al. | |
| 2011/0194553 A1 | 8/2011 | Sahin et al. | |
| 2011/0228779 A1 | 9/2011 | Goergen | |
| 2012/0023552 A1 | 1/2012 | Brown et al. | |
| 2012/0054367 A1 | 3/2012 | Ramakrishnan et al. | |
| 2012/0088476 A1 | 4/2012 | Greenfield | |
| 2012/0115512 A1 | 5/2012 | Grainger et al. | |
| 2012/0157126 A1 | 6/2012 | Rekimoto | |
| 2012/0167207 A1 | 6/2012 | Beckley et al. | |
| 2012/0182147 A1 | 7/2012 | Forster | |
| 2012/0311127 A1 | 12/2012 | Kandula et al. | |
| 2012/0324035 A1 | 12/2012 | Cantu et al. | |
| 2013/0029685 A1 | 1/2013 | Moshfeghi | |
| 2013/0039391 A1 | 2/2013 | Skarp | |
| 2013/0057435 A1 | 3/2013 | Kim | |
| 2013/0077612 A1 | 3/2013 | Khorami | |
| 2013/0088983 A1 | 4/2013 | Pragada et al. | |
| 2013/0107853 A1 | 5/2013 | Pettus et al. | |
| 2013/0108263 A1 | 5/2013 | Srinivas et al. | |
| 2013/0115916 A1 | 5/2013 | Herz | |
| 2013/0145008 A1 | 6/2013 | Kannan et al. | |
| 2013/0155906 A1 | 6/2013 | Nachum et al. | |
| 2013/0191567 A1 | 7/2013 | Rofougaran et al. | |
| 2013/0203445 A1 | 8/2013 | Grainger et al. | |
| 2013/0217332 A1 | 8/2013 | Altman et al. | |
| 2013/0232433 A1 | 9/2013 | Krajec et al. | |
| 2013/0273938 A1 | 10/2013 | Ng et al. | |
| 2013/0317944 A1 | 11/2013 | Huang et al. | |
| 2013/0322438 A1 | 12/2013 | Gospodarek et al. | |
| 2013/0343198 A1 | 12/2013 | Chhabra et al. | |
| 2013/0347103 A1 | 12/2013 | Veteikis et al. | |
| 2014/0007089 A1 | 1/2014 | Bosch et al. | |
| 2014/0016926 A1 | 1/2014 | Soto et al. | |
| 2014/0025770 A1 | 1/2014 | Warfield et al. | |
| 2014/0052508 A1 | 2/2014 | Pandey et al. | |
| 2014/0059655 A1 | 2/2014 | Beckley et al. | |
| 2014/0087693 A1 | 3/2014 | Walby et al. | |
| 2014/0105213 A1 | 4/2014 | A K et al. | |
| 2014/0118113 A1 | 5/2014 | Kaushik et al. | |
| 2014/0148196 A1 | 5/2014 | Bassan-Eskenazi et al. | |
| 2014/0179352 A1 | 6/2014 | V.M. et al. | |
| 2014/0191868 A1 | 7/2014 | Ortiz et al. | |
| 2014/0198808 A1 | 7/2014 | Zhou | |
| 2014/0233460 A1 | 8/2014 | Pettus et al. | |
| 2014/0269321 A1 | 9/2014 | Kamble et al. | |
| 2014/0302869 A1 | 10/2014 | Rosenbaum et al. | |
| 2014/0337824 A1 | 11/2014 | St. John et al. | |
| 2014/0341568 A1 | 11/2014 | Zhang et al. | |
| 2015/0016286 A1 | 1/2015 | Ganichev et al. | |
| 2015/0016423 A1* | 1/2015 | Yu | H04W 36/0022 370/331 |
| 2015/0016469 A1 | 1/2015 | Ganichev et al. | |
| 2015/0030024 A1 | 1/2015 | Venkataswami et al. | |
| 2015/0043581 A1 | 2/2015 | Devireddy et al. | |
| 2015/0050955 A1 | 2/2015 | Kim et al. | |
| 2015/0063166 A1 | 3/2015 | Sif et al. | |
| 2015/0065161 A1 | 3/2015 | Ganesh et al. | |
| 2015/0087330 A1 | 3/2015 | Prechner et al. | |
| 2015/0103818 A1 | 4/2015 | Kuhn et al. | |
| 2015/0163192 A1 | 6/2015 | Jain et al. | |
| 2015/0172391 A1 | 6/2015 | Kasslin et al. | |
| 2015/0223337 A1 | 8/2015 | Steinmacher-Burow | |
| 2015/0256972 A1 | 9/2015 | Markhovsky et al. | |
| 2015/0264519 A1 | 9/2015 | Mirzaei et al. | |
| 2015/0280827 A1 | 10/2015 | Adiletta et al. | |
| 2015/0288410 A1 | 10/2015 | Adiletta et al. | |
| 2015/0326704 A1 | 11/2015 | Ko et al. | |
| 2015/0358777 A1 | 12/2015 | Gupta | |
| 2015/0362581 A1 | 12/2015 | Friedman et al. | |
| 2016/0007315 A1 | 1/2016 | Lundgreen et al. | |

(56) References Cited

U.S. PATENT DOCUMENTS

| | | | |
|---|---|---|---|
| 2016/0044627 | A1 | 2/2016 | Aggarwal et al. |
| 2016/0099847 | A1 | 4/2016 | Melander et al. |
| 2016/0105408 | A1 | 4/2016 | Cooper et al. |
| 2016/0127875 | A1 | 5/2016 | Zampini, II |
| 2016/0146495 | A1 | 5/2016 | Malve et al. |
| 2016/0344641 | A1 | 11/2016 | Javidi et al. |
| 2017/0026974 | A1 | 1/2017 | Dey et al. |
| 2017/0214551 | A1 | 7/2017 | Chan et al. |
| 2018/0069311 | A1 | 3/2018 | Pallas et al. |
| 2018/0084389 | A1 | 3/2018 | Snyder et al. |

FOREIGN PATENT DOCUMENTS

| | | |
|---|---|---|
| WO | WO 2017/146434 | 8/2017 |
| WO | WO 2018/009340 | 1/2018 |

OTHER PUBLICATIONS

3GPP TS 29.272 Version 14.3.0, Mar. 2017 (Year: 2017).*

"Cisco ASR 5x00 Mobility Management Entity Administration Guide," Version 15.0, Last updated Jun. 13, 2014, Cisco, pp. 1-266.

"I Love WiFi, The difference between L2 and L3 Roaming Events," Apr. 1, 2010, 6 pages.

Afolabi, Ibrahim, et al., "Network Slicing & Softwarization: A Survey on Principles, Enabling Technologies & Solutions," Mar. 21, 2018, pp. 1-24.

Antonioli, Roberto, et al., "Dual Connectivity for LTE-NR Cellular Networks," Research Gate, Sep. 3-6, 2017, pp. 171-175.

Carter, Steve Sr., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cisco Systems, Inc., "Wi-FI Location-Based Services 4.1 Design Guide," May 20, 2008, 206 pages.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Galvan T., Carlos E., et al., "Wifi bluetooth based combined positioning algorithm," International Meeting of Electrical Engineering Research ENIINVIE 2012, Procedia Engineering 35 (2012 ), pp. 101-108.

Geller, Michael, et al. , "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Network Heresy, "NVGRE, VXLAN and What Microsoft is Doing Right," Oct. 3, 2011, 5 pages.

Saraiva de Sousa, Nathan F., et al., "Network Service Orchestration: A Survey," IEEE Communications Surveys & Tutorials, Mar. 23, 2018, pp. 1-30.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Ventre, Pier Luigi, et al., "Performance Evaluation and Tuning of Virtual Infrastructure Managers for (Micro) Virtual Network Functions" ieee.org, Nov. 7-10, 2016, pp. 1-7.

International Search Report and Written Opinion from the International Searching Authority, dated Sep. 16, 2019, 14 pages, for the corresponding International Patent Application No. PCT/US2019/044159.

"Digital cellular telecommunications system (Phase 2+) (GSM); Universal Mobile Telecommunications System (UMTS); Technical realization of the Short Message Service (SMS) (3GPP TS 23.040 version 15.1.1 Release 15)," ETS ITS 123 040 V15.1.0, Jun. 28, 2018, 219 pages.

\* cited by examiner

NETWORK-INITIATED RECOVERY FROM A TEXT MESSAGE DELIVERY FAILURE

TECHNICAL FIELD

The subject matter of this disclosure relates in general to the field of telecommunications networks, and more particularly, to systems and methods for network-initiated recovery from a delivery failure of a text message.

BACKGROUND

Text messaging (e.g., Short Message Service (SMS)) is a popular feature of telecommunications systems to facilitate the exchange of small amounts of data between fixed and/or mobile devices. Network operators can provide text messaging as a circuit-switched (CS) service in second generation (2G) (e.g., Global System for Mobile communications (GSM), Code Division Multiple Access (CDMA), General Packet Radio Service (GPRS), Enhanced Data rates for GSM Evolution (EDGE)) and third generation (3G) (e.g., Universal Mobile Telecommunications Systems (UMTS), Wideband CDMA (WCDMA), CDMA2000, High-Speed Packet Access (HSPA)) mobile networks. Long Term Evolution (LTE) (sometimes also referred to as Evolved Packet System (EPS)) is a wireless broadband technology developed by the Third Generation Partnership Project (3GPP) to succeed 2G/3G. LTE and later generation telecommunication networks may operate exclusively in the packet-switched (PS) domain while 2G/3G networks can operate in both the CS and PS domains. To enable network operators to continue to support certain CS services in a PS network, the 3GPP developed CS Fallback (CSFB) for voice and SMS over SGs for text messaging (e.g., as specified in 3GPP TS 29.118, which is fully incorporated herein by reference).

SMS over SGs allows the transmission of native SMS from CS infrastructure (e.g., 2G/3G core networks) to a Mobile Station (MS) or User Equipment (MS/UE) connected to a PS radio access network (e.g., 4G, 5G, and later generation networks). The SGs interface can be used to handle mobility management and paging procedures between the CS and PS domains, and to deliver Mobile Originating SMS (MO-SMS) and Mobile Terminating SMS (MT-SMS). Current implementations of SMS over SGs limit recovery from an SMS delivery failure (e.g., due to virtual location register (VLR) failure) to events triggered by the MS/UE (e.g., MO-SMS). However, it can sometimes be preferable to initiate recovery from an SMS delivery failure from the network (e.g., MT-SMS).

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
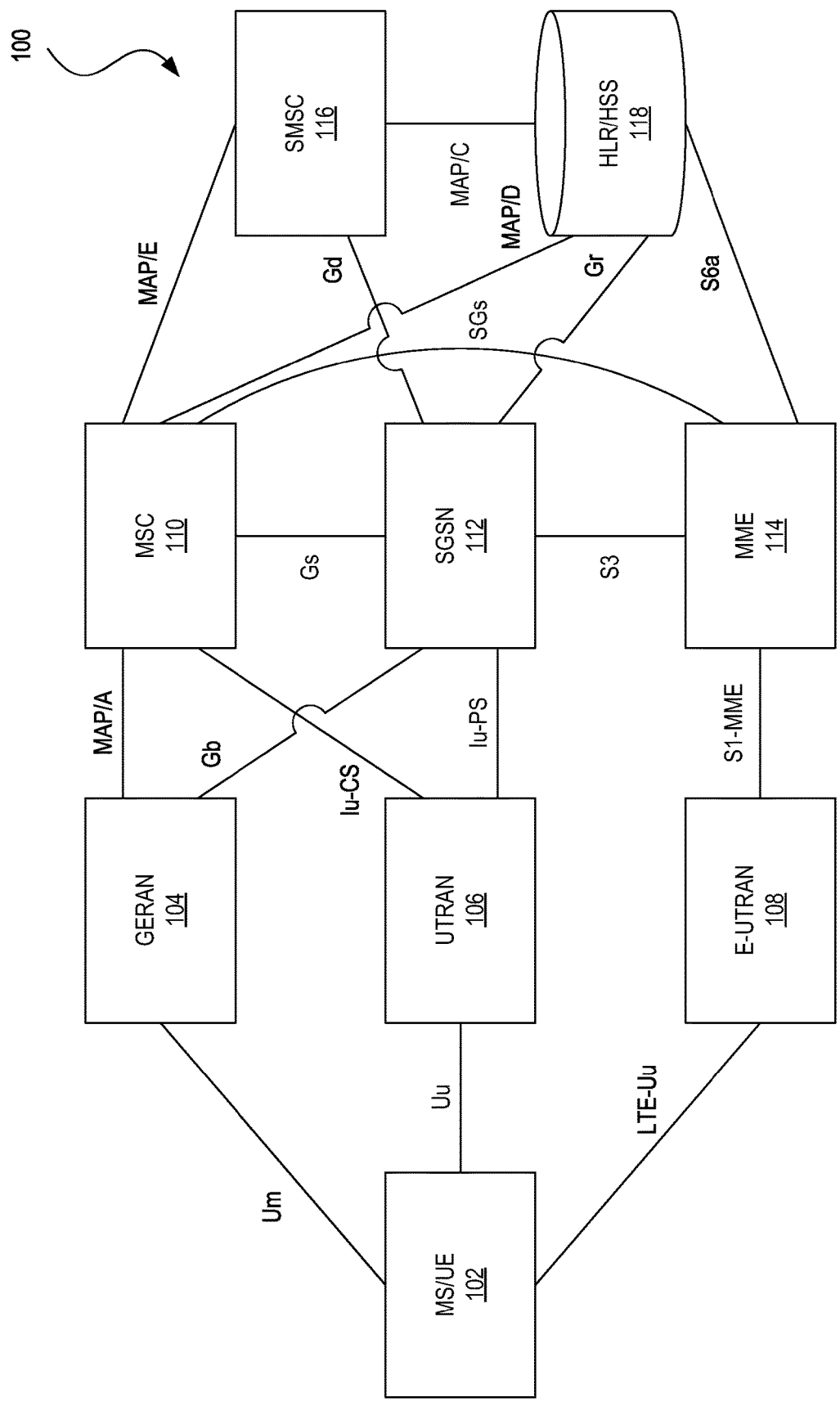
FIG. 1 illustrates an example of a network architecture for delivering a text message from circuit-switched infrastructure to a mobile station/user equipment connected to a packet-switched radio access network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for network-initiated recovery from a failure during transmission of text messages (e.g., Short Message Service or SMS) sent from circuit-switched (CS) infrastructure (e.g., GSM or UMTS core network) to a Mobile Station/User Equipment (MS/UE) connected to a PS radio access network (e.g., Evolved Packet System or EPS or later generation network). A text message service center (e.g., Short Message Service Center or SMSC) can receive a text message (e.g., Short Message or SM) destined for the MS/UE. The service center can request from a home location register (HLR) routing information to a first text message interworking function (e.g. SMS Interworking Function or SMS-IWF) associated with a first visitor location register (VLR). The service center can receive data indicating that the first SMS-IWF/VLR is unreachable. The service center can transmit to the HLR an indication of an absent subscriber causing the HLR to request a Mobility Management Entity (MME) to reattach the MS/UE to a second SMS-IWF/VLR. In some embodiments, the Reattach Request may indicate reattach only to the second SMS-IWF/VLR and not a combined EPS/International Mobile Subscriber Identity (IMSI) reattach.

EXAMPLE EMBODIMENTS

Networks can operate a text message service (e.g., SMS) that supports transmission of text messages from CS network elements to MS/UEs connected to a PS radio access network. For example, these networks can implement SMS over SGs, an interface between the CS domain and PS domain to allow location management coordination and to relay circuit-switched SMS messages over a packet-switched system (e.g., EPS). Network services, including SMS, can fail from time to time, and a network must have procedures in place to recover from such failures.

Current implementations of a text message service operating between the CS and PS domains may limit recovery from SMS delivery failure to actions or events triggered by a Mobile Station/User Equipment (MS/UE). That is, networks that support inter-domain SMS may not include any mechanism for initiating failure recovery from the network. This design may be based on the assumption that network-initiated failure recovery procedures are unnecessary because a user of an MS/UE will move often enough to trigger a Tracking Area Update (TAU) Request, configure the MS/UE to automatically reconnect to the network via periodic TAU Requests, or use SMS regularly to invoke a Service Request.

However, there are many circumstances where it may be preferable or even necessary for a network to have the capability to initiate recovery from SMS delivery failure. For example, many Internet-of-Things (IoT) or Machine-Type-Communication (MTC) applications can involve a SMS Messaging Entity (SME)/Application Server (AS) sending a Mobile-Terminated SMS (MT-SMS) to a MS/UE to wake or alert the MS/UE to perform some function. That is, the MS/UE may be passive devices that depend on the network to initiate interaction. Such applications can include smart metering (e.g., determining customers' usage of water, gas, electricity, etc.), inventory tracking (e.g., checking for parking space availability, whether a vending machine needs to resupply specific goods, whether an automated teller machine needs cash restocked, etc.), remote monitoring/sensing (e.g., monitoring whether a dumpster needs emptying, a street lamp needs replacement, a road needs to be plowed of snow, etc.), or home and facilities management (e.g., remote control of lighting, doors, garage doors, heating, ventilation, air conditioning, pet feeder, sprinklers or other watering system, appliances, etc.), among numerous other use cases. In these situations, the MS/UEs may have few (if any) mobility events. The MS/UEs may also be battery-operated or otherwise have power constraints such that the MS/UEs can only perform periodic TAU Requests or Service Requests after extensive periods of time (if at all). In current implementations, when SMS delivery failure occurs, recovery may only be achieved by actions of the MS/UE (e.g., TAU or Service Requests), and the MS/UEs are effectively unreachable by the SME/AS.

Various embodiments of the present disclosure can overcome these and other deficiencies of the prior art. For example, certain procedures between an SMS Center (SMSC), Home Location Register or Home Subscriber Server (e.g., HLR/HSS), and Mobility Management Entity (MME) can enable the SMSC to initiate recovery from an SMS delivery failure (e.g., failure of an SMS Interworking Function or Visitor Location Register (SMS-IWF/VLR)). The network-initiated failure recovery procedures can allow a network using devices with minimal radio interaction to recover from VLR failure, and make the network more robust and more power efficient. The procedures do not depend on the MS/UE sending an MO-SMS for VLR recovery. The procedures provide approaches for VLR recovery to MS/UEs that are not necessarily mobile or that are passive devices dependent on the network to initiate interaction. The procedures can operate with minimum state shared across VLRs such that the overall network may be cheaper to operate.

FIG. 1 illustrates an example of an architecture for a network 100 capable of delivering a text message (e.g., SMS) from circuit-switched (CS) infrastructure to a Mobile Station (MS/UE) connected to a packet-switched (PS) radio access network. One of ordinary skill in the art will understand that, for the network 100 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not necessarily depart from the scope of the present disclosure.

The network 100 can include one or more MS/UEs 102. The MS/UE 102 can be a terminal device for a mobile communication network, such as a laptop, tablet, smartphone, or wearable device (e.g., watch; eyeglasses, visor, head-mounted display or other device generally worn over a user's eyes; headphones, ear buds, or other device generally worn in or over a user's ears; etc.). The MS/UE 102 can also be a "smart" home device or Internet of Things (IoT) device (e.g., television, set-top box, digital video recorder (DVR), digital video disc (DVD) player or other media player, video game console, home appliance, smart meter, inventory tracker, sensor, etc.), or other electronic device.

The MS/UE 102 can have several associated identities, including an International Mobile Equipment Identity (IMEI), an International Mobile Subscriber Identity (IMSI), a Temporary Mobile Subscriber Identity (TMSI), and/or a Mobile Station Integrated Services Digital Network (MSISDN) number. The IMEI can be a unique number stored by the MS/UE 102, and may include a serial number and information indicating manufacturer, country of production, and type approval. The TMSI can be an alias used by a visitor location register (VLR) (and a Serving General Packet Radio Service (GPRS or G) Support Node (SGSN) 112 in some embodiments) to protect subscriber confidentiality. The TMSI may be temporarily used as a substitute for the IMSI to limit the number of times the IMSI is broadcast over an air interface. This can make it more difficult for intruders to use the IMSI to identify a subscriber. The MSISDN can be a mobile subscriber's directory number.

The MS/UE 102 can connect to one or more radio access networks, such as Global System for Mobile communications (GSM or G) Enhanced Data rates for GSM Evolution (EDGE or E) Radio Access Network (GERAN) 104 (sometimes also referred to as a 2G or 2.5G network), Universal Mobile Telecommunications System (UTMS or U) Terrestrial Radio Access Network (UTRAN) 106 (sometimes also referred to as a 3G network), or an Evolved UMTS Terrestrial Radio Access Network (E-UTRAN) 108 (sometimes also referred to as a Long Term Evolution (LTE) or 4G network). In this example, the MS/UE 102 connects to the GERAN 104, UTRAN 106, and E-UTRAN 108 over air interfaces Um, Uu, and LTE-Uu, respectively.

The GERAN 104 and UTRAN 106 can connect to a Mobile Switching Center (MSC) 110 over the A and Iu-CS interfaces, respectively. The MSC 110 is a network node responsible for routing of incoming and outgoing voice calls, SMS, and other services (e.g., conference calls, fax, and other CS data) over the CS domain. The MSC 110 can operate as a normal switching node of a public switched telephone network (PSTN) or ISDN and provide functionality in the CS domain for handling of the MS/UE 102, including registration, authentication, location updating, inter-MSC handovers, and call routing to a roaming subscriber.

The MSC 110 may include a Visitor Location Register (VLR) (not shown) and connect to a Home Location Register (HLR)/Home Subscriber Service (HSS) 118. Together with the MSC 110, the HLR/HSS 118 and VLR can provide CS call routing and roaming capabilities. The HLR/HSS 118 can include a database for storing subscriber information for the network 100. While there is logically one HLR/HSS 118 in the network 100, the HLR/HSS 118 may be implemented as a distributed database in other embodiments.

The HLR/HSS 118 can store administrative data related to each subscriber registered in the network 100 along with the subscriber's current location. The location of each MS/UE 102 registered to the HLR/HSS 118 may be stored to route calls to the subscribers served by the HLR/HSS 118. The location information can include the VLR address that currently serves the subscriber. Subscriber data stored in the HLR/HSS 118 can include the IMSI and the MSISDN of each MS/UE 102. The HLR/HSS 118 can also store additional subscriber information, such as authentication information, supplementary services (e.g., SMS, call forwarding, etc.), basic service subscription information, and service restrictions (e.g., roaming permission).

Like the HLR/HSS 118, a VLR can also store subscriber data. However, a VLR may store only a subset of the data of the HLR/HSS 118 for call control and provision of the subscribed services for each MS/UE 102 currently located in the geographical area controlled by the VLR. The VLR data may be only temporarily stored while the subscriber is in the area that is served by a particular VLR. A VLR may be associated with one or more MSCs 110. When a subscriber roams into the area of a new MSC, a location updating procedure may be applied. When the subscriber roams out of the area that is served by the VLR, the HLR/HSS 118 can request the VLR to remove the subscriber-related data.

The GERAN 104 and UTRAN 106 can also connect to the SGSN 112 via the Gb and Iu-PS interfaces, respectively. The SGSN 112 may connect to the MSC 110 and a Mobility Management Entity (MME) 114 over the Gs and S3 interfaces, respectively. The SGSN 112 can be responsible for delivering data packets from and to MS/UEs within its geographical service area. The tasks of the SGSN 112 can include packet routing and transfer, PS mobility management (e.g., attach/detach and location management), logical link management, and authentication and charging functions. The location register of the SGSN can store location information (such as current cell and current VLR) and user profiles (such as IMSI and address(es) used in the packet data network) of all PS users who are registered with the SGSN 112.

The E-UTRAN 108 can connect to the MME 114 over the S1-MME interface. The MME 114 can control the high-level operation of the MS/UE 102 when it is connected to the E-UTRAN 108, by sending the MS/UE 102 signaling messages about, for example, security and the management of data streams unrelated to radio communications. A network may contain one or more MMEs, each of which may be responsible for a certain geographical region that the network 100 serves. Each MS/UE 102 may be assigned to a single MME, which may be referred to as the serving MME, but the MS/UE 102 can be associated with a different MME, such as if the MS/UE 102 moves sufficiently far from its serving MME or if there is insufficient capacity on the serving MME, among other possibilities. The MME 114 can also control the other elements of the network 100 via signaling messages.

In the network 100, the MSC 110 can connect to the MME 114 over the SGs interface, defined in 3GPP Technical Specification (TS) 23.272, and which is fully incorporated herein by reference. The SGs interface is used for mobility management and paging procedures between the CS and PS domains, and is based on the Gs interface. The SGs interface can also be used for the delivery of mobile originating (MO) and mobile terminating (MT) SMS. From the MME 114, the SMS message can be delivered in a Non-Access Stratum (NAS) signaling message to the MS/UE 102. Mobile originated messages may take the reverse path. These procedures are sometimes referred to as SMS over SGs, and allows SMS to remain a non-IP-based service (e.g., transmitted over signaling channels). In the PS domain, the signaling channel is transported over the S1 link, which is based on IP. However, from an end-to-end point of view, SMS over SGs remains a non-IP service as the message over the air interface is not embedded in an IP packet but in a Radio Resource Control (RRC) signaling message. As a consequence, an IP-based higher layer application may not necessarily be required to send and receive SMS messages.

The network 100 also includes a Short Message Service Center (SMSC) 116. The SMSC may be connected to one or more public land mobile networks (PLMNs). The SMSC 116 can be addressed from the MS/UE 202 by an E.164 number in the numbering plan of the PLMN to which the SMSC 116 is connected. This E.164 number can uniquely identify the SMSC 116 to that PLMN. There may be an intermediate network between the PLMN and the SMSC 116. In this case, the PLMN can autonomously make a connection to the SMSC 116 using the SMSC's address in this intermediate network. The SMSC can connect to the MSC 110 and the SGSN 112 over the Mobile Application Part (MAP)/E and Gd interfaces, respectively. In addition, the SMSC 116 can connect to the HLR/HSS 118 over the MAP/C interface. The SMSC can be responsible for handling SMS in the CS domain. The SMSC 116 can route SMS messages and regulate their delivery. If a recipient is unavailable, the SMSC 116 can store SMS messages and forward them when the recipient becomes available.

Figure 2:
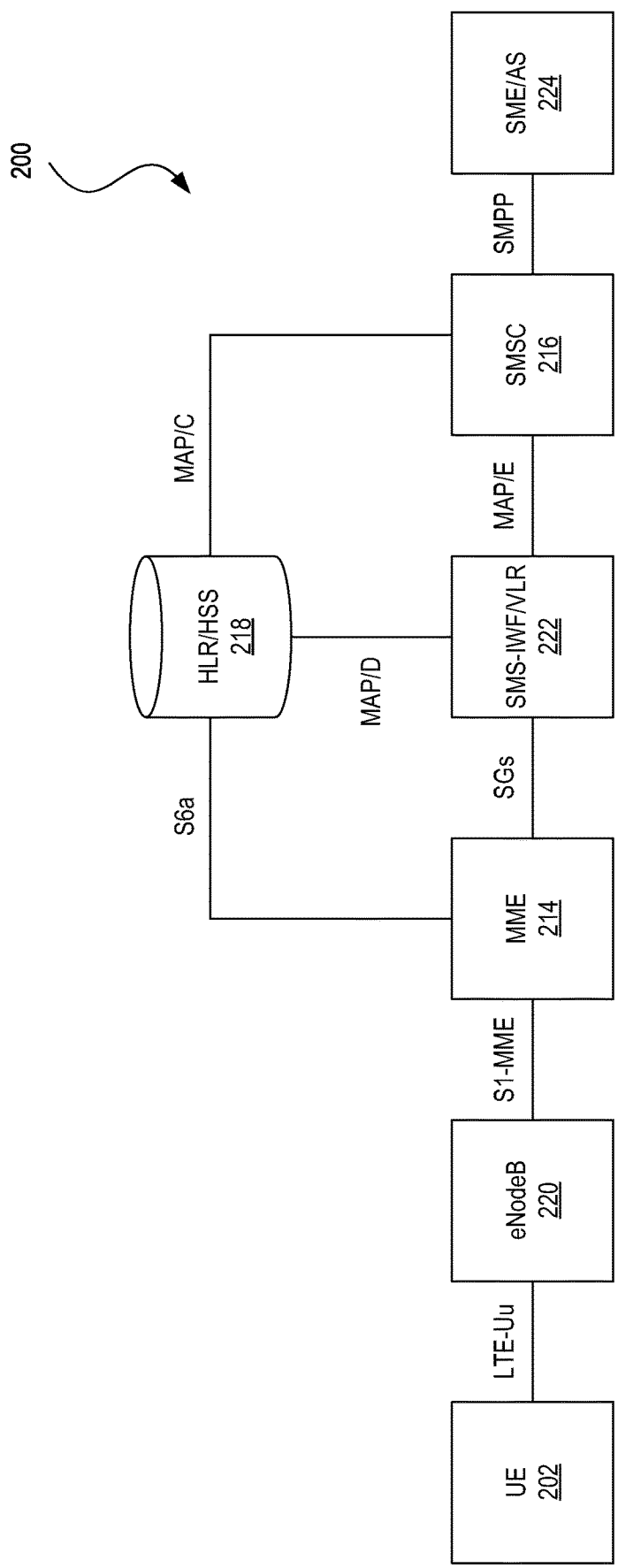
FIG. 2 illustrates another example of a network architecture for delivering a text message from circuit-switched infrastructure to a mobile station/user equipment connected to a packet-switched radio access network in accordance with an embodiment.

FIG. 2 illustrates another example of an architecture for a network 200 capable of delivering a text message from the CS domain over a PS network. The network 200 may operate in a similar manner as the network 100 but the network 200 may exclude certain elements for conciseness and clarity, and include additional elements for the purpose of providing a more thorough understanding of the subject matter of the present technology. However, it will be clear and apparent that the subject matter of this disclosure is not limited to these additional elements and may be practiced without them.

In this example, the network 200 may include one or more MS/UEs 202 connected to an E-UTRAN via an eNodeB 220. The eNodeB 220 is a base station that can control the radio network connectivity of MS/UEs in one or more cells. The eNodeB 220 can send radio transmissions to its MS/UEs on the downlink and receive transmissions from them on the uplink. The eNodeB 220 can also control the low-level operation of its MS/UEs when they are connected to the E-UTRAN by sending them signaling messages, such as handover commands. The eNodeB 220 can connect to an MME 214 over the S1-MME interface.

The network 200 also includes an SMS Interworking Function (SMS-IWF)/VLR 222 operating between the MME 214 (over the SGs interface) and an SMSC 216 (over the MAP/E interface) as a stand-alone network node. In addition, the SMS-IWF/VLR 222 can connect to the HLR/HSS 218 over the MAP/D interface, and the HLR/HSS 218 can connect to the SMSC 216 over the MAP/C interface. The SMS-IWF/VLR 222 can be used to facilitate location management, subscriber management, MO/MT-SMS, and other services related to SMS. In other embodiments, some or all of the functionality of the SMS-IWF/VLR 222 can be integrated into the MME 214, an MSC (e.g., the MSC 110), and/or the SMSC 216 as hardware, firmware, and/or software.

The network 200 also includes a Short Message Entity (SME)/Application Server (AS) 224. The SME/AS 224 is a network entity that sends/receives text messages (e.g., SMS). The SME/AS 224 is not necessarily connected wirelessly to the network 200, and can be a server (physical or virtual), desktop computer, or other electronic device having a wired connection to the network 200. The SME/AS 224 can also be a wireless device (e.g., laptop, tablet, smartphone, wearable device, smart device, IoT device, etc.). In this example, the SME/AS 224 connects to the SMSC 216 over the Short Message Peer-to-Peer (SMPP) protocol. In other embodiments, the SME/AS 224 can connect to the SMSC 216 over another protocol of the application layer of the Transmission Control Protocol (TCP)/Internet Protocol (IP) stack, such as Universal Computer Protocol (UCP), External Machine Interface (EMI), Computer Interface to Message Distribution (CIMD), Open Interface Specification (OIS), SMS2000, Hypertext Transfer Protocol (HTTP), File Transfer Protocol (FTP), or Simple Mail Transfer Protocol (SMTP), among others. As discussed above, the SME/AS 224 can be a part of a smart metering system that requests metering information from remote client devices, a parking inventory tracking system that queries the availability of a particular parking space, a vending machine system that tracks whether a vending machine is sufficiently stocked, a waste management system that checks whether a waste bin needs to be dumped, and the like. The SME/AS 224 can make such requests by sending an MT-SMS over CS infrastructure.

Figure 3:
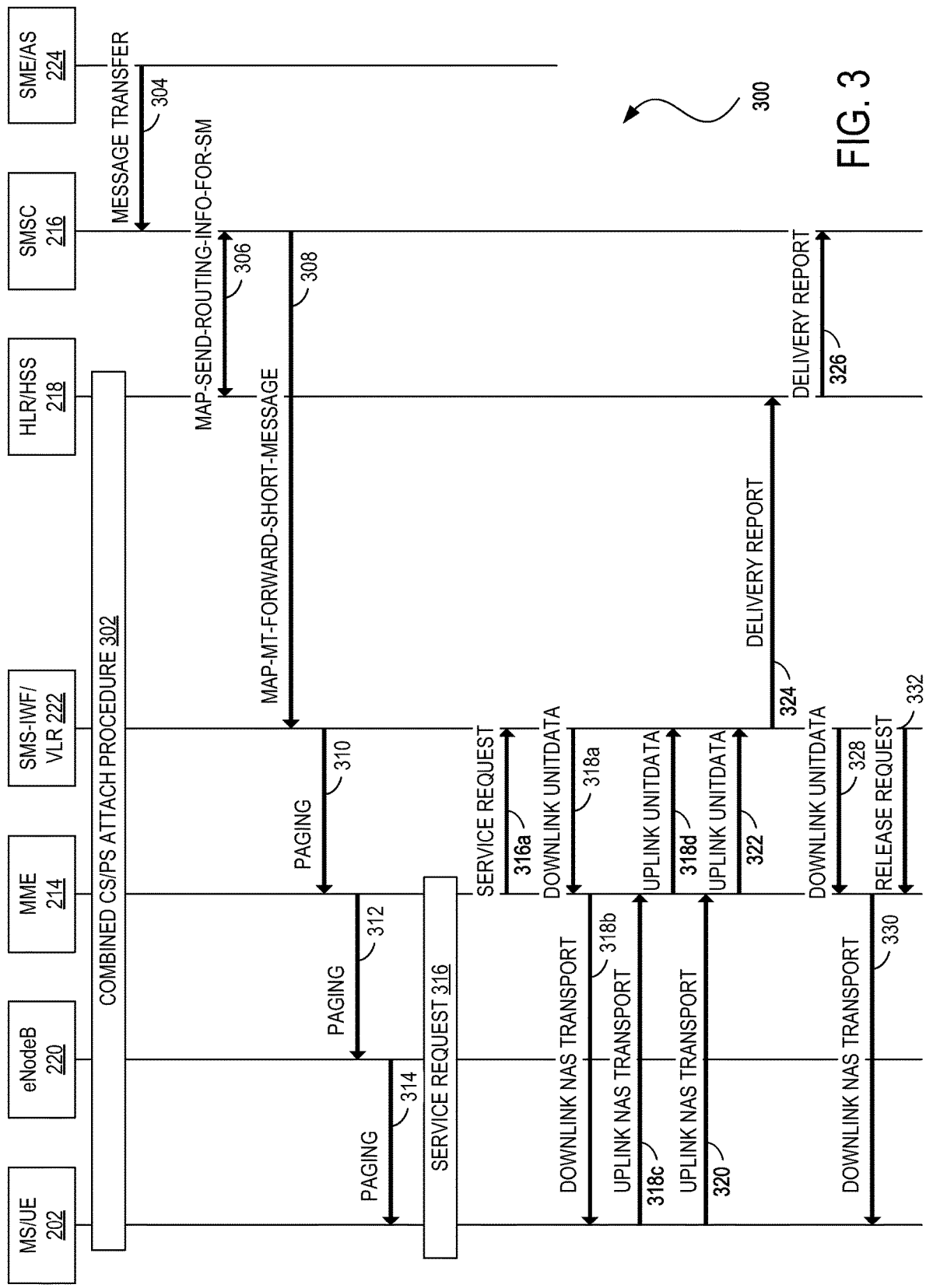
FIG. 3 illustrates an example of a process for delivering a text message from circuit-switched infrastructure to a mobile station/user equipment connected to a packet-switched radio access network in accordance with an embodiment.

FIG. 3 illustrates an example of a process 300 for delivering a text message (e.g., SMS) from CS infrastructure destined for the MS/UE 202 when the latter is connected to a PS radio access network. One of ordinary skill will understood that, for any processes discussed herein, there can be additional, fewer, or alternative steps performed in similar or alternative orders, or in parallel, within the scope of the various embodiments unless otherwise stated. In this example, the process 300 may begin with sequence 302, a combined attachment by the MS/UE 202 to CS services and PS services (e.g., the combined Evolved Packet System/International Mobile Subscriber Identity (EPS/IMSI) attach procedure (e.g., as set forth in 3GPP TS 23.272) discussed further below with respect to FIG. 4. The combined attachment procedure can register the MS/UE 202 for PS services (e.g., EPS services) and non-EPS services (e.g., SMS).

Figure 4:
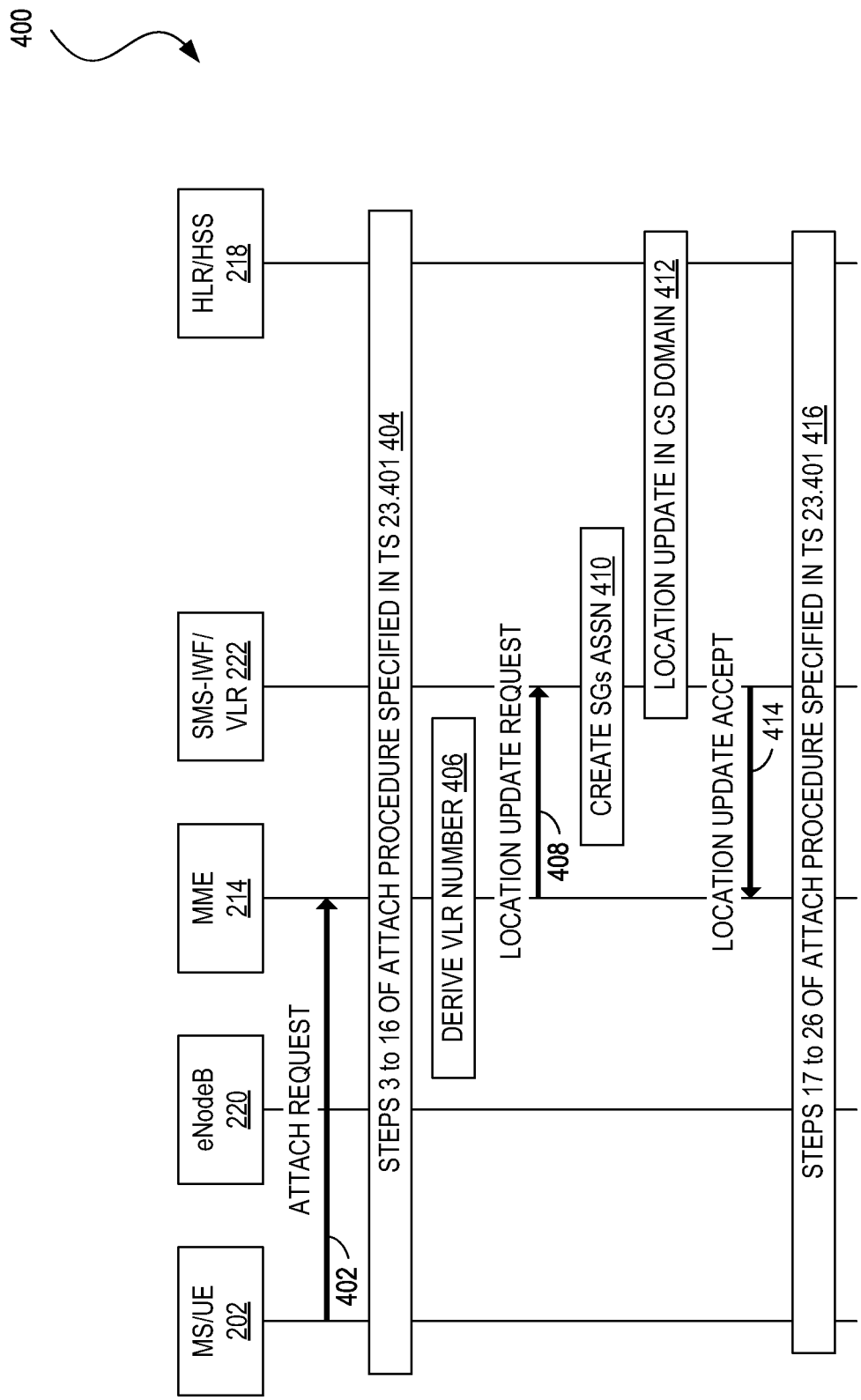
FIG. 4 illustrates an example of a process for combined attachment to packet-switched services and circuit-switched services in accordance with an embodiment.

FIG. 4 illustrates an example of a process 400 for a combined attach for CS and PS services (e.g., the combined EPS/IMSI attach procedure). At sequence 402, the MS/UE 202 can initiate the attach procedure by the transmission of an Attach Request message (e.g., with parameters as specified in 3GPP TS 23.401, which is fully incorporated herein by reference, and may include the Attach Type, old Location Area Identity (LAI), and Mobile Station Classmark 2) to the MME 214. The Attach Type can indicate that the MS/UE 202 requests a combined EPS/IMSI attach and can inform the network that the MS/UE 202 is capable and configured to use SMS over SGs. If the MS/UE 202 needs SMS service but not Circuit-switched Fallback (CSFB), the MS/UE 202 can include an "SMS-only" indication in the combined EPS/IMSI Attach Request. The process 400 may continue to sequence 404, which can include steps 3 to 16 of the EPS Attach procedure specified in 3GPP TS 23.401.

At 406, the MME 214 can derive a VLR number. For example, if multiple PLMNs are available for the CS domain, the MME 214 can select the PLMN for the CS domain and CS domain operator if the selected CS network is shared network configuration, based on the PLMN ID contained in the current Tracking Area Identity (TAI), old LAI, and operator selection policies on preferred radio access technology (RAT) for the CS domain. If the target network is a shared GERAN, the MME 214 can evaluate the capability of the MS/UE 202 to support GERAN network sharing when selecting the PLMN for the CS domain as specified in 3GPP TS 23.251, which is fully incorporated herein by reference. The PLMN selected for CS can be the same one that is used for the MS/UE 202 as a target PLMN for PS handovers or for other mobility procedures related to CSFB. The MME 214 may take any access restrictions provided by the HLR/HSS 218 into account if the network is using separate location areas for GERAN and UTRAN cells. The selected PLMN ID may be included in the newly allocated LAI sent to the SMS-IWF/VLR 222 in sequence 408 and in the Attach Accept to the MS/UE 202. The VLR number can be based on the newly allocated LAI and the Temporary Mobile Subscriber Identity (TMSI) based Network Resource Identity (NRI) provided by the MS/UE 202 or on the newly allocated LAI and an IMSI hash function (e.g., the hash function defined in 3GPP TS 23.236, which is fully incorporated herein by reference). The MME 214 can start the location update procedure toward the new VLR upon receipt of the subscriber data from the HLR/HSS 218 in sequence 404. This operation can mark the MS/UE 202 as EPS-attached to the SMS-IWF/VLR 222.

At 408, the MME 214 can send a Location Update Request message (e.g., new LAI, IMSI, MME name, Location Update Type as specified in 3GPP TS 29.118) to the SMS-IWF/VLR 222. The MME name can be a fully qualified domain name (FQDN) string. Examples in which the MME 214 can include the selected CS domain operator in the Location Update Request message towards the SMS-IWF/VLR 222 are discussed in 3GPP TS 23.251.

At 410, the SMS-IWF/VLR 222 can create an association with the MME 214 by storing the MME name. At 412, the SMS-IWF/VLR 222 can perform CS subscription checks, and if all checks are successful, perform the Location Updating procedure in the CS domain. At 414, the SMS-IWF/VLR 222 can respond with a Location Update Accept (VLR TMSI) to the MME 214 (e.g., as specified in 3GPP TS 29.118).

At sequence 416, the EPS Attach procedure may be completed by performing steps 17 to 26 as specified in 3GPP TS 23.401. The Attach Accept message can include the parameters as specified in 3GPP TS 23.401 (e.g., VLR TMSI and LAI as allocated in sequence 406). The existence of LAI and VLR TMSI can indicate successful attach to the CS domain. If the MS/UE 202 requests a combined EPS/IMSI Attach Request without the SMS-only indication, and if the network supports SGs procedures only for SMS, the MME 214 can indicate in the Attach Accept message that the IMSI attach is for SMS-only. When the network accepts a combined EPS/IMSI attach without limiting to SMS-only, the network may provide a "CSFB Not Preferred" indication to the MS/UE 202. If the MS/UE 202 requests a combined EPS/IMSI Attach Request with the SMS-only indication, and if the network supports SGs procedures only for SMS or if it supports SMS over SGs, the MME 214 can indicate in the Attach Accept message that the IMSI attach is for SMS-only. The network may provide the SMS-only or CSFB Not Preferred indications based on locally configured operator policies (e.g., as set forth in a roaming agreement). The behavior of the MS/UE 202 upon receiving such indications is described in 3GPP TS 23.221, which is fully incorporated herein by reference. If the PLMN ID for the CS domain (included in the LAI provided to the MS/UE 202) differs from the PLMN ID provided as part of the Globally Unique Temporary Identity (GUTI), the equivalent PLMNs list can include the PLMN ID for the CS domain.

Returning to FIG. 3, the process 300 can continue at 304 in which the SME/AS 224 may initiate transfer of an MT-SMS message to the MS/UE 202 via the SMSC 216. At sequence 306, the SMSC 216 can request the HLR/HSS 218 for routing information for SMS via the MAP-SEND-ROUTING-INFO-FOR-SM service (e.g., as specified in 3GPP TS 29.002, which is fully incorporated herein by reference). The HLR/HSS 218 can return a MAP-SEND-ING-ROUTING-INFO-FOR-SM response including one or more MT-SMS Target Node identities (e.g., SMS-IWF/VLR 222).

At 308, the SMSC 216 can forward the MT-SMS message to the SMS-IWF/VLR 222 where the MS/UE 202 is CS attached, such as by the MAP-MT-FORWARD-SHORT-MESSAGE service (e.g., as specified in 3GPP TS 29.002).

At 310, the SMS-IWF/VLR 222 can send a Paging message (e.g., as specified in 3GPP TS 29.118, and can include the IMSI, VLR TMSI, Location information, and SMS indicator) to the MME 214. At 312, the MME 214 can initiate the paging procedure by sending the Paging message (e.g., as specified in 3GPP TS 23.401) to each eNodeB 220 with cells belonging to the tracking area(s) in which the MS/UE 202 is registered. The MS/UE 202 can be paged with its System Architecture Evolution (SAE)-TMSI (S-TMSI). At 314, the eNodeB 220 can page the MS/UE 202 (e.g., as specified in 3GPP TS 23.401).

The process 300 can proceed to sequence 316, comprising a Service Request procedure between the MS/UE 202 and MME 214 (e.g., as specified in 3GPP TS 23.401). The Service Request procedure may include the MS/UE 202 sending a Service Request message to the MME 214 via the eNodeB 220. Then, the MS/UE 202 can provide its S-TMSI via Radio Resource Control (RRC) signaling. The MME 214 can subsequently send the S1-AP Initial Context Setup Request message to the eNodeB 220, and the eNodeB 220 can establish the Radio Bearers. In some embodiments, the MS/UE 202 and the MME 214 may use Control Plane Cellular IoT (CIoT) EPS Optimization to enable SMS transfer instead of the Service Request procedures defined in TS 23.401.

At 316a, the MME 214 can send a Service Request message to the SMS-IWF/VLR 222 (e.g., as specified in 3GPP TS 29.118). To permit the SMS-IWF/VLR 222 to create an accurate charging record, the MME 214 can add the International Mobile Equipment Identity software version (IMEISV), the local time zone, the Mobile Station Classmark 2, and the current TAI and E-UTRAN Cell Global Identity (E-CGI) of the MS/UE 202.

At 318a, the SMS-IWF/VLR 222 can build the SMS message (e.g., as defined in 3GPP TS 23.040, which is fully incorporated herein by reference, and can include CP-DATA/RP-DATA/TPDU/SMS-DELIVER parts). The SMS-IWF/VLR 222 can then forward the SMS message to the MME 214 in a Downlink Unitdata message as specified in specified in 3GPP TS 23.040. At 318b, the MME 214 can encapsulate the SMS message in a NAS message (e.g., as specified in 3GPP TS 24.301), and send the message to the MS/UE 202. At sequence 318c to 318d, the MS/UE 202 can acknowledge receipt of the SMS message to the SMS-IWF/VLR 222 via a NAS message (e.g., as specified in 3GPP TS 24.301) to the MME 214, and the MME 214 sending an Uplink Unitdata message (e.g., as specified in 3GPP TS 29.118) to the SMS-IWF/VLR 222.

At 320, the MS/UE 202 can return a delivery report (e.g., as specified in 3GPP TS 23.040) regarding the SMS message. The delivery report can be encapsulated in a NAS message (e.g., as specified in 3GPP TS 24.301) and sent to the MME 214. At 322, the MME 214 can forward the delivery report to the SMS-IWF/VLR 222 in an Uplink Unitdata message (e.g., as specified in 3GPP TS 29.118). At sequence 324 to 326, the delivery report can be forwarded to the SMSC 216 (e.g., as specified in 3GPP TS 23.040). In parallel to the sequence 324 to 326, at sequence 328 to 330, the SMS-IWF/VLR 222 can acknowledge receipt of the delivery report to the MS/UE 202. At 332, the SMS-IWF/VLR 222 can indicate to the MME 214 that no more NAS messages need to be tunneled to complete SMS delivery.

On occasion, there may be a network disruption such that it is not possible for the SME/AS 224 to send an MT-SMS to the MS/UE 202 (e.g., failure of the SMS-IWF/VLR 222). Current implementations limit recovery to such a failure to events triggered by the MS/UE 202 (e.g., Tracking Update Request, Service Request, etc.). For example, 3GPP TS 29.118 Clause 5.2.1 specifies that the location update for non-EPS services procedure in the SGs interface is always started as a consequence of direction actions from an MS/UE 202. As discussed above, this is a shortcoming for certain IoT/MTC applications in which MS/UEs may have no mobility events and do not perform periodic TAU Requests or Service Requests for lengthy periods of time (if at all) to conserve power. The MS/UE 202 is effectively unreachable by the SME/AS 224 under these circumstances.

Figure 5:
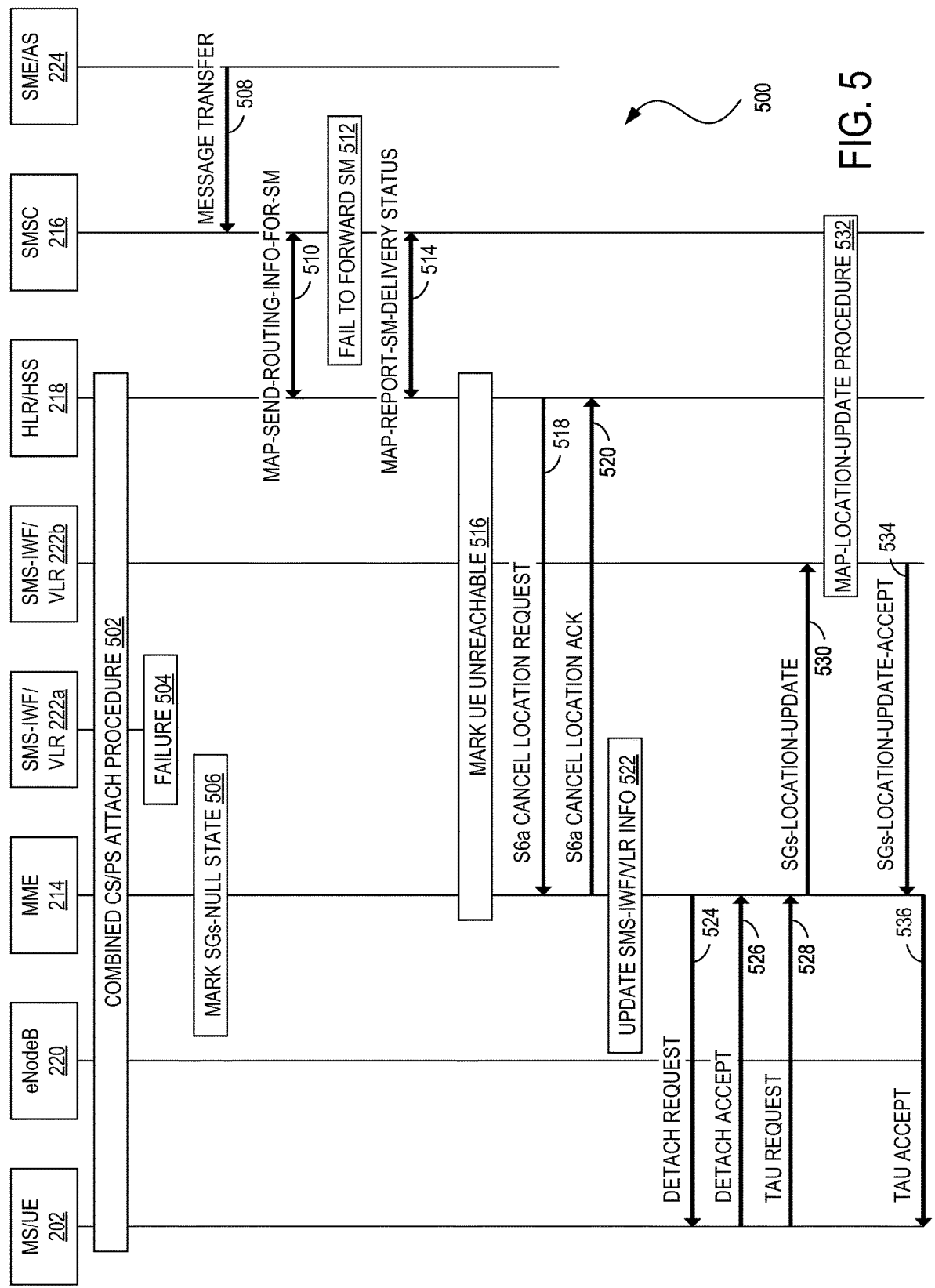
FIG. 5 illustrates an example of a process for robust delivery of a text message from circuit-switched infrastructure to a mobile station/user equipment connected to a packet-switched radio access network in accordance with an embodiment.

FIG. 5 illustrates an example of a process 500 for robust delivery of a text message from a CS core network to a device connected to a PS radio access network. For example, the process 500 can be used for network-initiated recovery (e.g., via the SME/AS 224 by MT-SMS) from SMS delivery failure. The process 500 may begin with sequence 502, which can comprise a combined attach procedure for CS services and PS services (e.g., the combined EPS/IMSI attach procedure defined in 3GPP TS 23.060, and discussed with respect to FIG. 4).

At 504, a failure of the SMS-IWF/VLR 222a can occur. The SMS-IWF/VLR 222a can move from a current state to the SGs-NULL state for any MS/UEs with which it has an SGs association (e.g., the MS/UE 202). The SMS-IWF/VLR 222a can also set the "Confirmed by Radio Contact" restoration indicator to False for these MS/UEs. When the SMS-IWF/VLR 222a restarts, it can send an SGsAP-RESET-INDICATION message to all the MMEs connected to the SMS-IWF/VLR 222a by the SGs interface (e.g., MME 214). This message can indicate to the MME 214 that for the MS/UEs (e.g., MS/UE 202) with an SGs association to the SMS-IWF/VLR 222a, the SGs association is no longer reliable. The SMS-IWF/VLR 222a can also start a separate timer Ts11 for the MME 214. Upon receipt of an SGsAP-RESET-ACK message from the MME 214, the SMS-IWF/VLR 222a can stop the timer Ts11 for the MME 214.

At 506, the MME 214 can detect the failure of the SMS-IWF/VLR 222a and mark the status of the SMS-IWF/VLR 222a as SGs-NULL for all MS/UEs registered on SMS-IWF/VLR 222a (e.g., the MS/UE 202). The MME 214 can also set the VLR-Reliable MM context variable to False.

At 508, the SME/AS 224 can initiate transfer of an MT-SMS to the MS/UE 202 via the SMSC 216. At sequence 510, the SMSC 216 can request the HLR/HSS 218 for routing information for SMS services via the MAP-SEND-ROUTING-INFO-FOR-SM service (e.g., as specified in 3GPP TS 29.002). The HLR/HSS 218 can return a MAP-SENDING-ROUTING-INFO-FOR-SM response including one or more MT-SMS Target Node identities (e.g., SMS-IWF/VLR 222a and SMS-IWF/VLR 222b).

At 512, the SMSC 216 can attempt to forward the MT-SMS message to the SMS-IWF/VLR 222a but is unsuccessful due to the failure of the SMS-IWF/VLR 222a at 504. As discussed above, under current implementations, MT-SMS messages to the MS/UE 202 will fail and recovery may only be triggered by the MS/UE 202. For example, 3GPP TS 29.118 Clause 5.7 sets forth the procedures when encountering such a failure by setting the VLR-Reliable state in the MME 214 to False and limiting restoration of the VLR-Reliable state to procedures initiated by the MS/UE 202 (e.g., TAU Request or Service Request). 3GPP TS 29.118 currently does not specify any recovery or restore procedures that are network-initiated.

However, at 514, instead of waiting for the MS/UE 202 to initiate recovery from the failure of the SMS-IWF/VLR 222a, the SMSC 216 can inform the HLR/HSS 218 of the failure using the MAP-REPORT-SM-DELIVERY-STATUS service to set the SM Delivery Outcome field to Absent Subscriber and the Absent Subscriber Diagnostic field to a new value (e.g., VLR Unreachable) to indicate failure of the SMS-IWF/VLR 222a. Table 1 shows an example of how the assignment of values to reasons for Absent Subscriber (e.g., as defined in 3GPP TS 23.040) can be updated. Upon receipt of the SM delivery report, HLR/HSS 218 can return an Acknowledgement of the delivery report.

TABLE 1

Assignment of values to reasons for Absent Subscriber

| Value | Reason for Absence |
|---|---|
| 0 | no paging response via the MSC |
| 1 | IMSI detached |
| 2 | roaming restriction |
| 3 | deregistered in the HLR for non GPRS |
| 4 | MS purged for non GPRS |
| 5 | no paging response via the SGSN |
| 6 | GPRS detached |
| 7 | deregistered in the HLR for GPRS |
| 8 | MS purged for GPRS |
| 9 | Unidentified subscriber via the MSC |
| 10 | Unidentified subscriber via the SGSN |
| 11 | deregistered in the HSS/HLR for IMS |
| 12 | no response via the IP-SM-GW |
| 13 | the MS is temporarily unavailable |
| 14 | VLR unreachable (NEW) |

At 516, the HLR/HSS 218 can parse the SM Delivery Outcome field indicating a delivery failure due to an Absent Subscriber and/or parse the Absent Subscriber Diagnostic field indicating VLR Unreachable and mark the MS/UE 202 as Unreachable. For example, the HLR/HSS 218 can associate the subscription of the SMSC 216 for reachability to the MS/UE 202 and the User Reachability Request Parameter for MME (URRP-MME), set the URRP-MME parameter, and send an Insert Subscriber Data Request to the MME 214 that includes the UE Reachability Request flag in the IDR Request Flags to request the MME 214 to notify the HLR/HSS 218 when the MS/UE 202 becomes reachable again. If the Insert Subscriber Data Request is only sent for the purpose of requesting the MME 214 for MS/UE reachability status notification, the Subscription-Data AVP can be empty in the Insert Subscriber Data Request. The HLR/HSS 218 can send the Insert Subscriber Data Request message to the MME 214 over the S6a interface (e.g., as specified in 3GPP TS 29.272).

In some embodiments, the HLR/HSS 218 can additionally or alternatively use the SMS Messages-Waiting service for subscribing the HLR/HSS 218 for notification of reachability of the MS/UE 202. The Messages-Waiting is the service element that enables a PLMN to provide the HLR/HSS 218 and SMS-IWF/VLR 222a with which the MS/UE 202 is associated with the information that there is a message in the SMSC 216 waiting to be delivered to the MS/UE 202. This information, denoted the Messages Waiting Indication (MWI), can include Messages Waiting Data (MWD), the Mobile-station-Not-Reachable-for-GPRS (MNRG), the UE-Not-Reachable-for-IP (UNRI), the Mobile Station Not Reachable Flag (MNRF), the Mobile-Not-Reachable-via-the-MSC-Reason (MNRR-MSC), the Mobile-Not-Reachable-via-the-SGSN-Reason (MNRR-SGSN), the UE Not Reachable-Reason (UNRR) and the Mobile Station Memory Capacity Exceeded Flag (MCEF) located in the HLR/HSS 218 and the Mobile Station Not Reachable Flag (MNRF) located in the SMS-IWF/VLR 222a.

The MWD can include a list of addresses (SC Addr) of SMSCs (e.g., SMSC 216) which have made previous unsuccessful delivery attempts of a message. In order to be able to send alert messages to every SMSC which has made unsuccessful SMS delivery attempts to an MS/UE, the HLR/HSS 218 can store the MSISDN Alert or IMSI-Alert (e.g., as specified in 3GPP TS 23.040) together with references to the SMSC addresses. If using the Messages-Waiting service, the HLR/HSS 218 can insert the address of the SMSC 216 into the MWD list, set the MNRF, and indicate Absent Subscriber in the MNRR-MSC (e.g., Mobile Not Reachable diagnostic information). When the HLR/HSS 218 detects that the MS/UE 202 has recovered operation, the HLR can clear the MNRF and MNRR-MSC. Then, if there is a non-empty MWD list, the HLR/HSS 218 can invoke operations to alert the SMSCs within the MWD to resend waiting messages. After each SMSC is alerted by the HLR/HSS 218, the address for that SMSC can be deleted from the MWD.

Sequence 518 to 536 can represent an optimized Reattach procedure because it would not require the MS/UE 202 to perform a full Reattach procedure (e.g., a combined EPS/IMSI Reattach). In some embodiments, the optimized procedure may require modification of the MME 214. The HLR/HSS 218 can initiate the Reattach VLR only procedure at 518 by signaling the MME 214 using a CANCEL_LOCATION_REQUEST command over the S6a interface as defined in 3GPP TS 29.272. In some embodiments, the CANCEL_LOCATION_REQUEST command may use a new Cancellation-Type (e.g., REATTACH_VLR_ONLY) to indicate failure of the SMS-IWF/VLR 222a and to request for the MS/UE 202 to only reattach to a new VLR (e.g., SMS-IWF/VLR 222b). Table 2 shows an example of how the Cancellation-Type Attribute-Value Pairs (AVP) (e.g., as defined in 3GPP TS 29.272) can be updated.

TABLE 2

Cancellation-Type AVP

| Value | Type | Reason for Absence |
|---|---|---|
| 0 | MME_UPDATE_PROCEDURE | This value is used when the Cancel Location Request is sent to the previous MME due to a received Update Location Request from a new MME. |
| 1 | SGSN_UPDATE_PROCEDURE | This value is used when the Cancel Location Request is sent to the previous SGSN due to a received Update Location Request from a new SGSN. |
| 2 | SUBSCRIPTION_WITHDRAWAL | This value is used: when the Cancel Location Request is sent by the HSS to the current MME or SGSN due to withdrawal of the user's subscription by the HSS operator; when the Cancel Visitor Public Land Mobile Network (VPLMN or V) Closed Subscriber Group (VCSG) Location is sent by the Client Security Service (CSS) to the current MME or SGSN due to withdrawal of the user's VPLMN CSG subscription by the CSS operator. |
| 3 | UPDATE_PROCEDURE_IWF | This value is used by an IWF when interworking with a pre-Release-8 HSS. |
| 4 | INITIAL_ATTACH_PROCEDURE | This value is used when the Cancel Location Request is sent to the MME or SGSN due to a received Update Location Request during initial attach procedure from an SGSN or MME respectively. |
| 5 | REATTACH_VLR_ONLY | This value is used when the Cancel Location Request is sent by the HSS to the MME to request Reattach to the VLR only (NEW) |

At 520, the MME 214 can send a Cancel Location Answer command to the HLR/HSS 218 over the S6a interface, indicated by the Command-Code field set to 317 and the 'R' bit cleared in the Command Flags field (e.g., as specified in 3GPP TS 29.272). At 522, the MME 214 can determine the state of the MS/UE 202 to be SGs-NULL. This can prompt the MME 214 to update the SMS-IWF/VLR information (e.g., as specified in 3GPP TS 29.118). For example, the MME 214 can select an alternative SMS-IWF/VLR (e.g., SMS-IWF/VLR 222b) that is in service for the MS/UE 202 and perform a Location Update for non-EPS services procedure towards the SMS-IWF/VLR 222b.

At 524, the MME 214 can send to the MS/UE 202 a DETACH REQUEST message (e.g., as specified in TS 3GPP 24.301) with an IMSI Detach indication. At 526, the MS/UE 202 can maintain the EPS bearer context(s) including the default EPS bearer context, and send a DETACH ACCEPT message (e.g., as specified in TS 3GPP 24.301) to the MME 214. At 528, the MS/UE 202 can re-attach to non-EPS services by performing the combined TA/LA procedure (e.g., as specified in 3GPP TS 24.301). This can include the MS/UE 202 sending to the MME 214 a TRACKING AREA UPDATE REQUEST message (e.g., as specified in 3GPP TS 24.301, including the Update Type, old LAI and Mobile Station Classmark 2) with EPS Update type IE indicating combined TA/LA updating with IMSI Attach.

At 530, the MME 214 can transmit a Location Update Request to the SMS-IWF/VLR 222b over the SGs interface (e.g., as specified in 3GPP TS 29.118). If multiple PLMNs are available for the CS domain, the MME 214 can select the PLMN for the CS domain and CS domain operator if the selected CS network is shared network configuration, based on the current TAI, old LAI, and operator selection policies on preferred Radio Access Technology (RAT) for the CS domain. If the target network is a shared GERAN, the MME 214 can evaluate the capability of the MS/UE 202 to support network sharing when selecting the PLMN for the CS domain. The PLMN selected for CS may be the same one used by the MS/UE 202 as a target PLMN for PS handovers or other mobility procedures related to CSFB. The MME 214 may also evaluate access restrictions provided by the HLR/HSS 218 if the network is using separate location areas for GERAN and UTRAN cells. The selected PLMN ID can be included in the newly allocated LAI. If the association must be established or if the LA has changed, the MME 214 can send a Location Update Request message (e.g., new LAI, IMSI, MME name, Location Update Type, selected CS domain operator) to the SMS-IWF/VLR 222b. The MME 214 can retrieve the corresponding VLR number from the determined LAI. If multiple SMS-IWF/VLRs serve the LAI, the TMSI based NRI as provided by the MS/UE 202 or an IMSI hash function (e.g., the hash function defined in 3GPP TS 23.236) can be used to retrieve the VLR number for the LAI. The Location Update Type can indicate normal location update. The MME name can be a FQDN string.

At 532, the SMS-IWF/VLR 222b can send a MAP-LOCATION-UPDATE message (e.g., as specified in 3GPP TS 29.002) to the HLR/HSS 218. The HLR/HSS 218 can utilize the Alert-SC service (e.g., as specified in 3GPP TS 23.040) to indicate to the SMSC 216 that the MS/UE 202 is again ready to receive SMS. On receipt of the Alert-SC, the SMSC 216 can initiate the delivery attempt procedure for the queued messages destined for the MS/UE 202.

At 534, the SMS-IWF/VLR 222b can move the SGs association to the SGs-ASSOCIATED state, set the Confirmed by Radio Contact restoration indicator to True, update the SGs association by storing the MME address included in SGsAP-LOCATION-UPDATE-REQUEST message, and send an SGsAP-LOCATION-UPDATE-ACCEPT message to the MME 214. This message can include the LAI received in the New location area identifier information element in the SGsAP-LOCATION-UPDATE-REQUEST message sent at 530.

The process 500 can conclude at 536. After the MME 214 receives the SGsAP-LOCATION-UPDATE-ACCEPT message from the SMS-VLR 222b, the MME 214 can stop timer Ts6-1, move the state of the SGs association to SGs-ASSOCIATED, set the MM context variable VLR-Reliable to True, and indicate to the MS/UE 202 the acceptance of the SMS-IWF/VLR 222b for the Location Update procedure. The message sent to the MS/UE 202 can include the LAI encapsulated via NAS (e.g., as specified in 3GPP TS 24.301).

Figure 6:
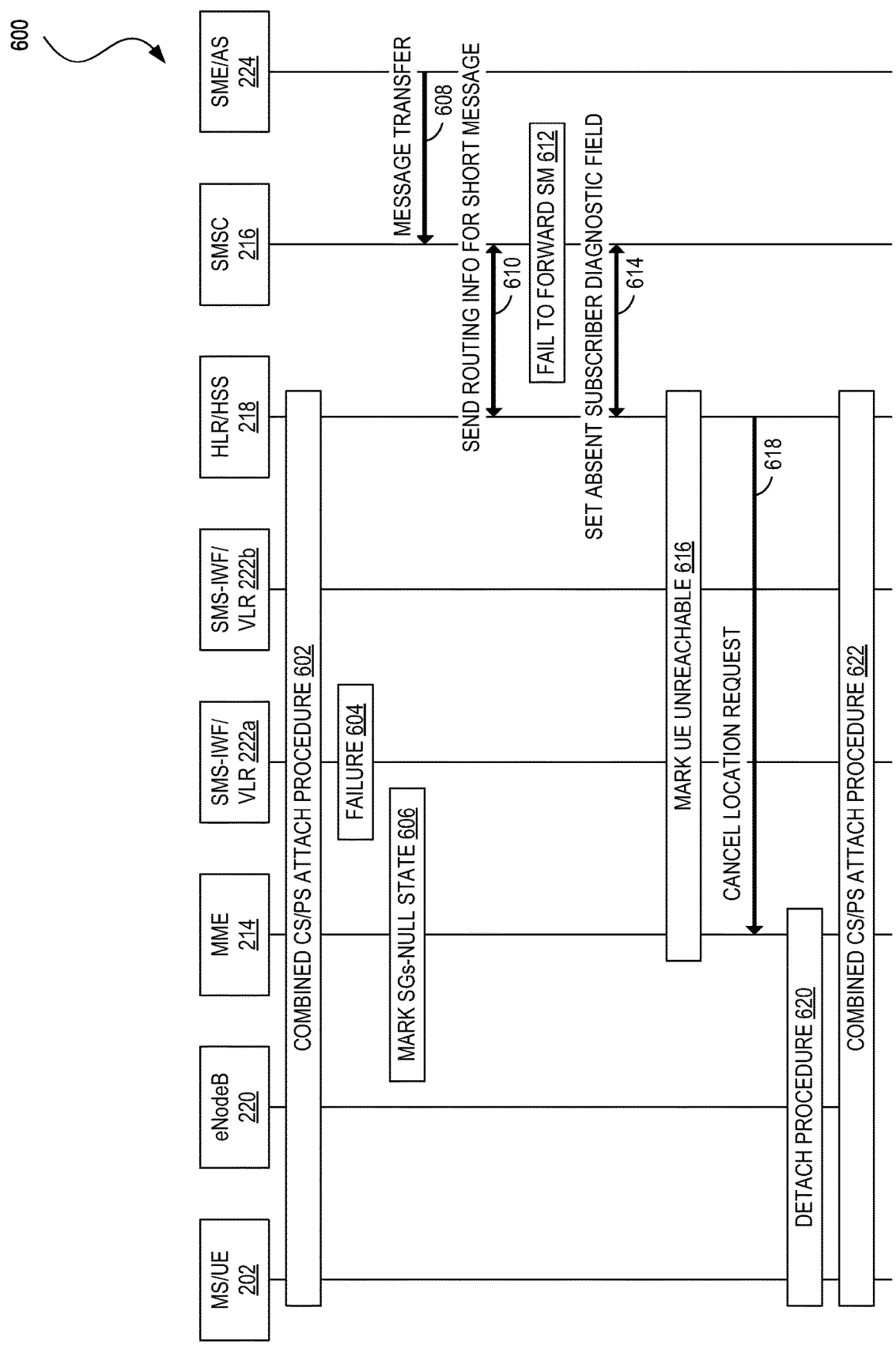
FIG. 6 illustrates another example of a process for robust delivery of a text message from circuit-switched infrastructure to a mobile station/user equipment connected to a packet-switched radio access network in accordance with an embodiment.

FIG. 6 illustrates another example of a process 600 for robust delivery of a text message from a CS core network to a MS/UE connected to a PS radio access network. For example, the process 600 can be used for network-initiated recovery (e.g., via the SME/AS 224 by MT-SMS) from SMS delivery failure. The process 600 can be similar to the process 500, such as from sequence 602 beginning with sequence 602 comprising a combined attached procedure for CS services and PS services (e.g., the combined EPS/IMSI attach procedure defined in 3GPP TS 23.060, and discussed with respect to FIG. 4).

Upon failure of the SMS-IWF/VLR 222a at 604, the SMS-IWF/VLR 222a can transition from a current state to the SGs-NULL state for any MS/UEs with which it has an SGs association (e.g., the MS/UE 202). In addition, the SMS-IWF/VLR 222a can set the "Confirmed by Radio Contact" restoration indicator to False for its associated MS/UEs. Upon restart, the SMS-IWF/VLR 222a can send an SGsAP-RESET-INDICATION message to all the MMEs connected to the SMS-IWF/VLR 222a by the SGs interface (e.g., MME 214). This message can indicate to the MME 214 that the SGs association is no longer reliable for the MS/UEs (e.g., MS/UE 202) associated with the SMS-IWF/VLR 222a. The SMS-IWF/VLR 222a can also start a separate timer Ts11 for the MME 214. Upon receiving an SGsAP-RESET-ACK message from the MME 214, the SMS-IWF/VLR 222a can stop the timer Ts11 for the MME 214.

At 606, the MME 214 can detect the failure of the SMS-IWF/VLR 222a. The MME 214 can then mark the status of the SMS-IWF/VLR 222a as SGs-NULL for all MS/UEs registered on SMS-IWF/VLR 222a (e.g., the MS/UE 202). The MME 214 can also set the VLR-Reliable MM context variable to False.

The SME/AS 224 can initiate transfer of an MT-SMS to the MS/UE 202 via the SMSC 216 at 608. Then at sequence 610, the SMSC 216 can request the HLR/HSS 218 for routing information for SMS services via the MAP-SEND-ROUTING-INFO-FOR-SM service (e.g., as specified in 3GPP TS 29.002) and the HLR/HSS 218 can return a MAP-SENDING-ROUTING-INFO-FOR-SM response including one or more MT-SMS Target Node identities (e.g., SMS-IWF/VLR 222a and SMS-IWF/VLR 222b).

The SMSC 216 can attempt to forward the MT-SMS message to the SMS-IWF/VLR 222a at 612. The attempt is unsuccessful due to the failure of the SMS-IWF/VLR 222a at 604. However, instead of waiting for the MS/UE 202 to initiate failure recovery as would happen under current implementations, the SMSC 216 can initiate failure recovery at 614. The SMSC 216 can indicate to the HLR/HSS 218 of the failure of the SMS-IWF/VLR 222a via the MAP-REPORT-SM-DELIVERY-STATUS service to set the SM Delivery Outcome field to Absent Subscriber and the Absent Subscriber Diagnostic field to a new value (e.g., VLR Unreachable, as specified in Table 1) to indicate the failure. The HLR/HSS 218 can return an Acknowledgement of the SM delivery report after receiving it.

At 616, the HLR/HSS 218 can determine an SMS delivery failure due to an Absent Subscriber and/or Absent Subscriber Diagnostic field indicating VLR Unreachable. The HLR/HSS can mark the MS/UE 202 as Unreachable. For example, the HLR/HSS 218 can associate the subscription of the SMSC 216 for reachability to the MS/UE 202 and the User Reachability Request Parameter for MME (URRP-MME), set the URRP-MME parameter, and send an Insert Subscriber Data Request to the MME 214 that includes the UE Reachability Request flag in the IDR Request Flags to request the MME 214 to notify the HLR/HSS 218 when the MS/UE 202 becomes reachable again. If the Insert Subscriber Data Request is only sent for the purpose of requesting the MME 214 for MS/UE reachability status notification, the Subscription-Data AVP can be empty in the Insert Subscriber Data Request. The HLR/HSS 218 can send the Insert Subscriber Data Request message to the MME 214 over the S6a interface (e.g., as specified in 3GPP TS 29.272). Alternatively or in addition, the HLR/HSS 218 can utilize the SMS Messages-Waiting service for subscribing the HLR/HSS 218 for notification of reachability of the MS/UE 202, such as by can inserting the address of the SMSC 216 into the MWD list, setting the MNRF, and indicating Absent Subscriber in the MNRR-MSC.

The processes 500 and 600 can differ at this point. Whereas the process 500 may require modification of the MME 214 to perform a Reattach to VLR only procedure from sequence 518 to 536, the process 600 may not require modification of the MME 214. Instead, at 618, the HLR/HSS 218 can initiate the full Reattach procedure by sending a CANCEL_LOCATION_REQUEST command to the MME 214 over the S6a interface (e.g., as specified in 3GPP TS 29.272). The CANCEL_LOCATION_REQUEST message may include a Cancellation-Type of INITIAL_ATTACH_PROCEDURE to invoke the full Reattach procedure.

At 620, the HLR/HSS 217 can initiate the Detach procedure (e.g., as specified in 3GPP TS 23.272). This can include performing the HSS-initiated Detach procedure (e.g., as specified in 3GPP TS 23.401), the MME sending an EPS Detach Indication (IMSI) message to the SMS-IWF/VLR 222a, the SMS-IWF/VLR 222a removing the SGs association with the MME 214, and completing the HSS-initiated Detach procedure by performing steps 8a to 10a as specified 3GPP TS 23.401. At 622, the process 600 can conclude with the combined Attach Procedure for CS services and PS services (e.g., the combined EPS/IMSI Attach procedure defined in 3GPP TS 23.060, and discussed with respect to FIG. 4)

Figure 7A:
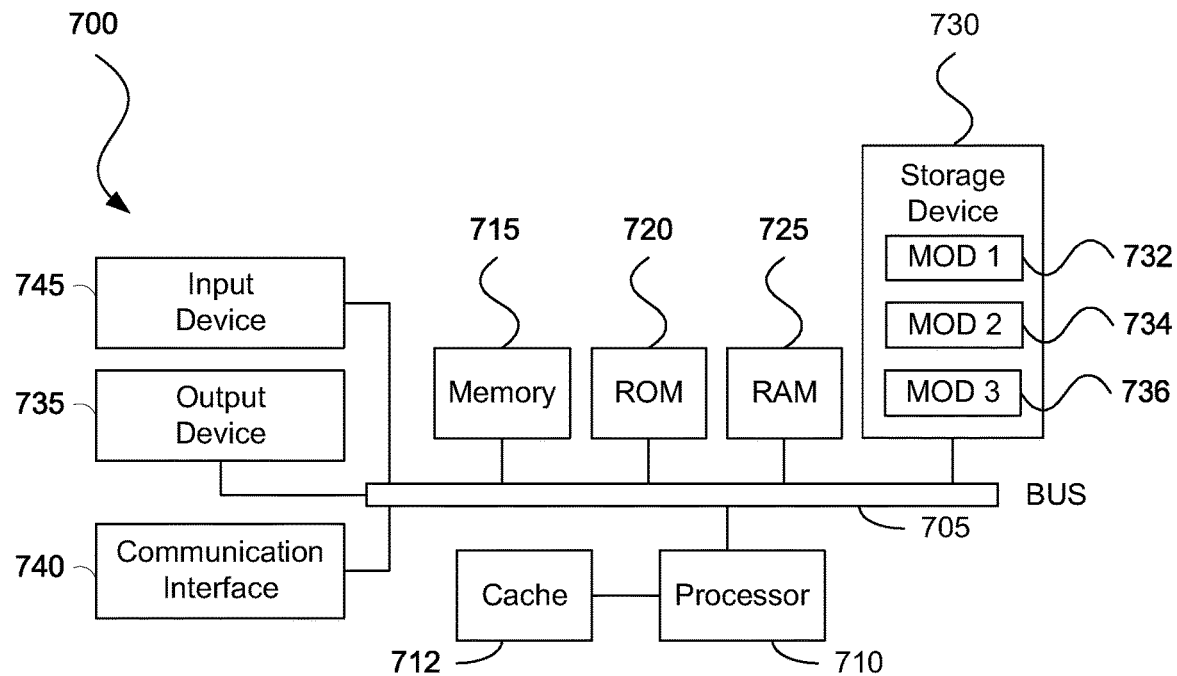
FIGS. 7A and 7B illustrate examples of systems in accordance with some embodiments.
Figure 7B:
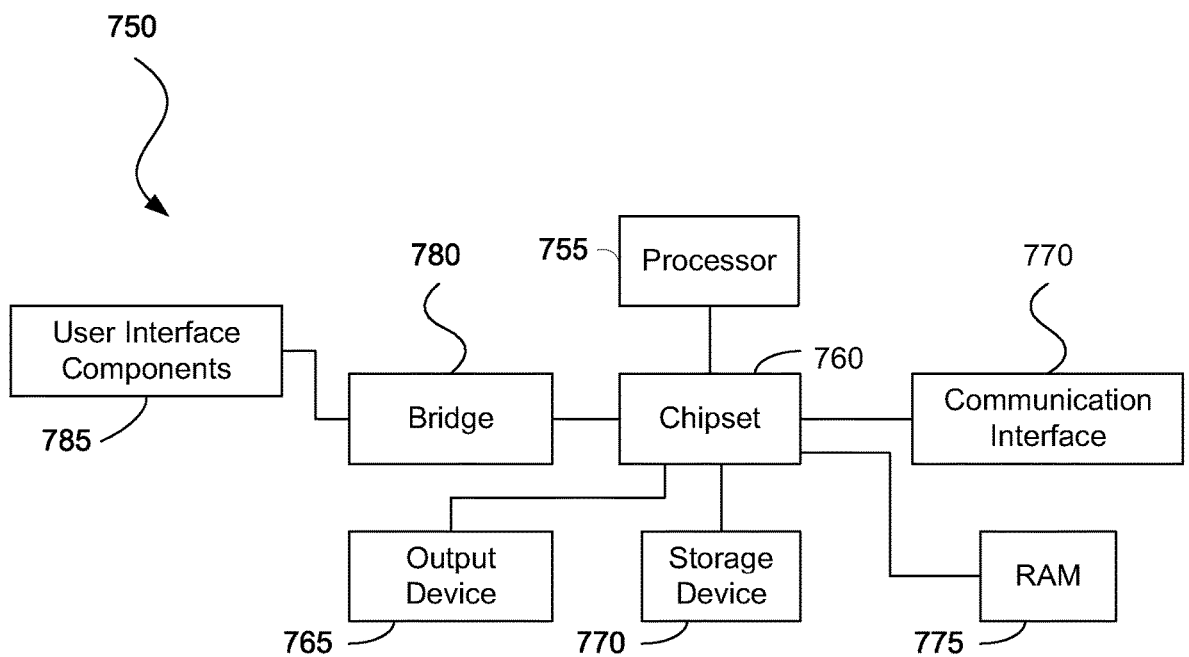

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a conventional chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving, by a message service center, a message for termination at a user equipment;
receiving, by the message service center from a home location register (HLR), routing information to a first visitor location register (VLR) associated with the user equipment;
receiving, by the message service center, a delivery report indicating that the first VLR is unreachable; and
transmitting, by the message service center to the HLR, a delivery outcome message indicating an absent subscriber to the HLR to cause the HLR to initiate a reattach procedure between the user equipment and a second VLR, wherein the reattach procedure includes:
transmitting, by the HLR to a Mobility Management Entity (MME), a cancel location request including a cancellation type indicating to only reattach to the second VLR; and
receiving, by the HLR from the MME, a cancel location answer from the MME.

2. The computer-implemented method of claim 1, further comprising:
generating a reattach request indicating for the user equipment to reattach for packet-switched services and non-packet-switched services.

3. The computer-implemented method of claim 1, further comprising:
generating the delivery outcome message to include absent subscriber diagnostic information indicating that the first VLR is unreachable.

4. The computer-implemented method of claim 1, further comprising:
transmitting, by the HLR to the MME, an insert subscriber data request including information subscribing the HLR to a reachability status of the user equipment.

5. The computer-implemented method of claim 1, further comprising:
updating, by the HLR, messages waiting data to include an address of the message service center;
setting, by the HLR, a mobile not reachable flag to true; and
updating, by the HLR, mobile not reachable diagnostic information to indicate an absent subscriber.

6. The computer-implemented method of claim 5, further comprising:
receiving, by the HLR, an indication that the user equipment is reachable;
clearing, by the HLR, the mobile not reachable flag and the mobile not reachable diagnostic information; and
alerting, by the HLR, the message service center that the user equipment is reachable to cause the message service center to resend the message to the user equipment.

7. The computer-implemented method of claim 1, further comprising:
determining, by the MME, an SGs null state between the user equipment and the first VLR;
transmitting, by the MME to the user equipment, a detach request indicating International Mobile Subscriber Identity (IMSI) detach;
receiving, by the MME from the user equipment, a combined tracking area/location area update request with IMSI attach;
transmitting, by the MME to the second VLR, a location update request;
receiving, by the MME from the second VLR, a location update accept message; and
transmitting, by the MME to the user equipment, a tracking area update accept message.

8. The computer-implemented method of claim 1, wherein the message service center is associated with a circuit-switched domain and the user equipment is associated with a packet-switched domain.

9. The computer-implemented method of claim 1, further comprising:
updating messages waiting data to include an address of the message service center;
receiving an indication that the user equipment is reachable; and
alerting the message service center that the user equipment is reachable to cause the message service center to resend the message to the user equipment.

10. A system comprising:
one or more processors; and
at least one computer-readable storage medium having stored therein instructions which, when executed by the one or more processors, cause the one or more processors to:
receive a message for termination at a user equipment;
receive, from a home location register (HLR), routing information to a first visitor location register (VLR) associated with the user equipment;
receive a delivery report indicating that the first VLR is unreachable; and
transmit to the HLR a delivery outcome message indicating an absent subscriber to the HLR to cause the HLR to initiate a reattach procedure between the user equipment and a second VLR, wherein the reattach procedure includes causing the HLR to:
transmit a cancel location request to a Mobility Management Entity (MME) including a cancellation type indicating to only reattach to a second VLR; and
receive a cancel location answer from the MME.

11. The system of claim 10, wherein the instructions when executed further cause the one or more processors to:
generate the delivery outcome message to include absent subscriber diagnostic information indicating that the first VLR is unreachable.

12. The system of claim 10, wherein the instructions when executed further cause the one or more processors to:
transmit to the MME an insert subscriber data request including information subscribing the HLR to a reachability status of the user equipment.

13. The system of claim 10, wherein the instructions when executed further cause the one or more processors to:
update messages waiting data to include an address of the system;
set a mobile not reachable flag to true; and update mobile not reachable diagnostic information to indicate an absent subscriber.

14. The system of claim 13, wherein the instructions when executed further cause the system to:
  receive an indication that the user equipment is reachable;
  clear the mobile not reachable flag and the mobile not reachable diagnostic information; and
  alert the system that the user equipment is reachable to cause the system to resend the message to the user equipment.

15. The system of claim 10, wherein the instructions when executed further cause the one or more processors to:
  determine an SGs null state between the user equipment and the first VLR;
  transmit to the user equipment a detach request indicating International Mobile Subscriber Identity (IMSI) detach;
  receive from the user equipment a combined tracking area/location area update request with IMSI attach;
  transmit a location update request to the second VLR;
  receive a location update accept message from the second VLR; and
  transmit a tracking area update accept message to the user equipment.

16. The system of claim 10, wherein the instructions when executed further cause the one or more processors to:
  update messages waiting data to include an address of the system;
  receive an indication that the user equipment is reachable; and
  alert the system that the user equipment is reachable to cause the system to resend the message to the user equipment.

17. A non-transitory computer-readable storage medium having stored therein instructions which, when executed by one or more processors, cause the one or more processors to:
  receive a message for termination at a user equipment;
  receive, from a home location register (HLR), routing information to a first visitor location register (VLR) associated with the user equipment;
  receive a delivery report indicating that the first VLR is unreachable; and
  transmit to the HLR a delivery outcome message indicating an absent subscriber to the HLR to cause the HLR to initiate a reattach procedure between the user equipment and a second VLR, wherein the reattach procedure includes causing the HLR to:
    transmit a cancel location request to a Mobility Management Entity (MME) including a cancellation type indicating to only reattach to a second VLR; and
    receive a cancel location answer from the MME.

18. The non-transitory computer-readable storage medium of claim 17, wherein the instructions when executed further cause the one or more processors to:
  update messages waiting data to include an address of a message service center;
  receive an indication that the user equipment is reachable; and
  alert the message service center that the user equipment is reachable to cause the message service center to resend the message to the user equipment.

19. The non-transitory computer-readable storage medium of claim 17, wherein the instructions when executed further cause the one or more processors to:
  determine an SGs null state between the user equipment and the first VLR;
  transmit to the user equipment a detach request indicating International Mobile Subscriber Identity (IMSI) detach;
  receive from the user equipment a combined tracking area/location area update request with IMSI attach;
  transmit a location update request to the second VLR;
  receive a location update accept message from the second VLR; and
  transmit a tracking area update accept message to the user equipment.

20. The non-transitory computer-readable storage medium of claim 17, wherein the instructions when executed further cause the one or more processors to:
  update messages waiting data to include an address of a message service center;
  set a mobile not reachable flag to true;
  update mobile not reachable diagnostic information to indicate an absent subscriber;
  receive an indication that the user equipment is reachable;
  clear the mobile not reachable flag and the mobile not reachable diagnostic information; and
  alert the message service center that the user equipment is reachable to cause the message service center to resend the message to the user equipment.

* * * * *